US012607155B2

(12) United States Patent
Sato et al.

(10) Patent No.: US 12,607,155 B2
(45) Date of Patent: Apr. 21, 2026

(54) CYLINDER LINER AND RECIPROCATING ENGINE COMPRISING CYLINDER LINER

(71) Applicants: TPR CO., LTD., Tokyo (JP); TPR INDUSTRY CO., LTD., Sagae (JP)

(72) Inventors: Takashi Sato, Sagae (JP); Yasutomo Tokairin, Sagae (JP); Koji Kamata, Sagae (JP); Kiyoyuki Kawai, Tokyo (JP)

(73) Assignees: TPR CO., LTD., Tokyo (JP); TPR INDUSTRY CO., LTD., Sagae (JP)

( * ) Notice: Subject to any disclaimer, the term of this patent is extended or adjusted under 35 U.S.C. 154(b) by 0 days.

(21) Appl. No.: 18/846,210

(22) PCT Filed: Mar. 13, 2023

(86) PCT No.: PCT/JP2023/009502
§ 371 (c)(1),
(2) Date: Sep. 11, 2024

(87) PCT Pub. No.: WO2023/189457
PCT Pub. Date: Oct. 5, 2023

(65) Prior Publication Data
US 2025/0188886 A1 Jun. 12, 2025

(30) Foreign Application Priority Data
Mar. 30, 2022 (JP) ................................ 2022-056375

(51) Int. Cl.
*F02F 1/00* (2006.01)

(52) U.S. Cl.
CPC .................................... *F02F 1/004* (2013.01)

(58) Field of Classification Search
CPC ...... F02F 1/004; F02F 1/00; F02F 1/10; F16J 10/00; F16J 10/04
See application file for complete search history.

(56) References Cited

U.S. PATENT DOCUMENTS 3,033,183 A * 5/1962 Erickson ................... F02F 1/08 123/193.2
4,524,498 A * 6/1985 Hartsock ............... F02F 7/0087 123/669
(Continued)

FOREIGN PATENT DOCUMENTS

JP H09-126047 A 5/1997
JP 10089145 A * 4/1998 ................ F02F 1/16
(Continued)

OTHER PUBLICATIONS

Patent Cooperation Treaty, International Search Report, Application No. PCT/JP2023/009502, dated Apr. 18, 2023, in 4 pages.

*Primary Examiner* — Grant Moubry
(74) *Attorney, Agent, or Firm* — PROCOPIO, CORY, HARGREAVES & SAVITCH LLP

(57) ABSTRACT

In order to enable improvement with respect to recycling performance, achieve further reduction in weight, and improve environmental performance, a cylinder liner (30) according to the present disclosure has a structure in which, out of an inner face (21*i*) of a cylinder (21) in a reciprocating engine, the cylinder liner is provided in only a partial region over which a piston ring (50) fit onto a piston (40) that performs reciprocal motion in the cylinder (21) slides, and a liner entire length L along an axial direction of the cylinder (21) is smaller than an inner diameter B of the cylinder, and recessed and protruding forms are formed on one lower end portion (30*d*) that is an end portion toward a bottom dead center side of the piston ring (50) in the axial direction.

10 Claims, 6 Drawing Sheets

(56) References Cited

U.S. PATENT DOCUMENTS

| | | | | | |
|---|---|---|---|---|---|
| 5,069,266 | A * | 12/1991 | Nakatani | B22D 19/0009 164/112 |
| 5,749,331 | A * | 5/1998 | Pettersson | F16J 10/04 123/193.2 |
| 7,438,037 | B2 * | 10/2008 | Oogake | F02F 1/004 123/193.2 |
| 9,255,544 | B2 * | 2/2016 | Takahara | F02F 1/004 |
| 2007/0012180 | A1 * | 1/2007 | Miyamoto | C23C 24/04 123/193.2 |
| 2015/0020757 | A1 * | 1/2015 | Highum | B22D 15/02 123/41.01 |

FOREIGN PATENT DOCUMENTS

| | | | | |
|---|---|---|---|---|
| JP | 2009-243356 A | 10/2009 | | |
| JP | 2009-243386 A | 10/2009 | | |
| JP | 2018-003673 A | 1/2018 | | |
| WO | WO-2008124464 A1 * | 10/2008 | | B22F 3/02 |

* cited by examiner

CYLINDER LINER AND RECIPROCATING ENGINE COMPRISING CYLINDER LINER

CROSS-REFERENCE TO RELATED APPLICATIONS

This application is a US National Stage of International Patent Application PCT/JP2023/009502, filed on Mar. 13, 2023, which claims benefit of priority from Japanese Patent Application 2022-056375, filed on Mar. 30, 2022, the contents of both of which are incorporated herein by reference.

TECHNICAL FIELD

The present invention relates to a cylinder liner, and to a reciprocating engine equipped with the cylinder liner.

BACKGROUND ART

In a cylinder block used in a reciprocating engine, such as an internal combustion engine like an automotive engine, or the like, for example, a cylinder liner, which is one of crucial functional parts making up inside of the engine, is disposed on an inner peripheral side of the cylinder (e.g., see Patent Document 1). One technique for manufacturing the cylinder block with the cylinder liner disposed therein is to dispose in advance the cylinder liners in a casting mold for the cylinder block, and pour casting material into the casting mold, thereby performing enveloped casting in which an outer periphery of the cylinder liners is enveloped with the casting material. In such a technique for manufacturing a cylinder block, there is known, as a type of cylinder liner disposed within the casting mold in advance, a spiny liner that has a plurality of protrusions on an outer circumferential face of the cylinder liner, to improve junction strength with respect to the cylinder block. Conversely, there is an arrangement in which cylinder liners are inserted into the cylinder block, which include a dry type in which coolant does not come into direct contact with the cylinder liner, and a wet type in which coolant comes into direct contact with the cylinder liner.

CITATION LIST

Patent Document

Patent Document 1: Japanese Patent No. 6528736

SUMMARY

Technical Problem

However, in a case in which the outer periphery of the cylinder liner is enveloped by the casting material in the casting as described above, and in particular in a case in which the cylinder liner is a spiny liner having a plurality of protrusions on the surface thereof, extracting and separating the cylinder liner from the cylinder block becomes difficult. Given the current state of heightened awareness regarding recycling of waste materials in particular, this is far from being environment-friendly. There also has been an issue in that reduction in weight of conventional cylinder liners has reached its limits, regardless of whether enveloped casting, dry type, or wet type. Also, there are internal combustion engines that are being designed with stress on low-revolutions and mid-load range where fuel milage is good, besides designs with stress on high-revolutions and high-output range from former days.

Accordingly, an object of the present invention is to provide a cylinder liner with a novel structure, and a reciprocating engine equipped with the cylinder liner, capable of improving recycling performance and also further achieving reduction in weight, hence improving environmental performance.

Solution to Problem

An aspect of the present invention is a cylinder liner provided in a reciprocating engine, the cylinder liner being a cylinder liner which is provided in, out of an inner face of a cylinder in the reciprocating engine, only a partial region over which a piston ring fit onto a piston that performs reciprocal motion in the cylinder slides, and in which a cylinder liner entire length along an axial direction of the cylinder is smaller than an inner diameter of the cylinder.

The cylinder liner according to the above aspect can be extracted from and separated from the cylinder block at the time of discarding, due to having a structure other than enveloped casting around an outer periphery thereof with casting material, not having a plurality of protrusions for raising joining strength with respect to the block, or not necessarily requiring to be manufactured by enveloped casting. Accordingly, in the current state of heightened awareness regarding recycling of waste materials, recycling performance can be improved, and hence a structure that is environment-friendly can be provided.

The above cylinder liner may have a structure where recessed and protruding forms, which change in axial-direction length, are formed on one end portion that is an end portion toward a bottom dead center side of the piston ring in the axial direction, as viewed from a center axis toward an outer side in a radial direction.

Also, the cylinder liner according to the above aspect has the recessed and protruding forms of which the axial-direction length change, which are provided in only a portion of the region over which the piston ring slides, and also are formed on one end portion thereof that is the end portion toward the bottom dead center of the piston ring in the axial direction. Accordingly, while lessening unevenness at a boundary portion between the cylinder liner and the cylinder block in the sliding region of the piston ring such that movement of the piston and the piston ring is not affected, the entire length (axial-direction length) of the cylinder liner can be shortened, thereby realizing reduced size and reduced weight.

In the cylinder liner such as described above, out of the recessed and protruding forms, a protruding portion that protrudes to the bottom dead center side may be formed having a shape, in which the axial-direction length, becomes longer, gradually or stepwise, toward the bottom dead center side of the piston ring.

In the cylinder liner such as described above, a plurality of the protruding portions forming the recessed and protruding forms may be disposed continuously in a peripheral direction.

In the cylinder liner such as described above, a radial-direction thickness thereof may change gradually or stepwise.

In the cylinder liner such as described above, the cylinder liner may be formed in a tapered form in which an inner diameter of the cylinder liner gradually increases and expands in diameter from the recessed and protruding forms toward the bottom dead center side of the piston ring.

An adhesive layer may be provided on an outer periphery of the cylinder liner such as described above.

A screw portion may be formed on at least part of an outer periphery of the cylinder liner such as described above.

In the cylinder liner such as described above, out of the recessed and protruding forms, an axial-direction length of a protruding portion that protrudes to the bottom dead center side may be shorter than a pitch of a screw of the screw portion.

In a reciprocating engine according to another aspect of the present invention, an inner diameter of the cylinder liner such as described above may be no greater than an inner diameter of the cylinder.

In a reciprocating engine such as described above, the cylinder liner is provided to, of the inner face of the cylinder, at least a portion where wear resistance with respect to the piston ring is necessary.

In the reciprocating engine such as described above, the cylinder liner may be provided to, of the inner face of the cylinder, a region near a top dead center of the piston ring.

Advantageous Effects of Invention

According to the present invention, a cylinder liner with a novel structure, and a reciprocating engine equipped with the cylinder liner, capable of improving recycling performance and also further achieving reduction in weight, and hence improving environmental performance, can be provided.

DESCRIPTION OF EMBODIMENTS

Figure 1:
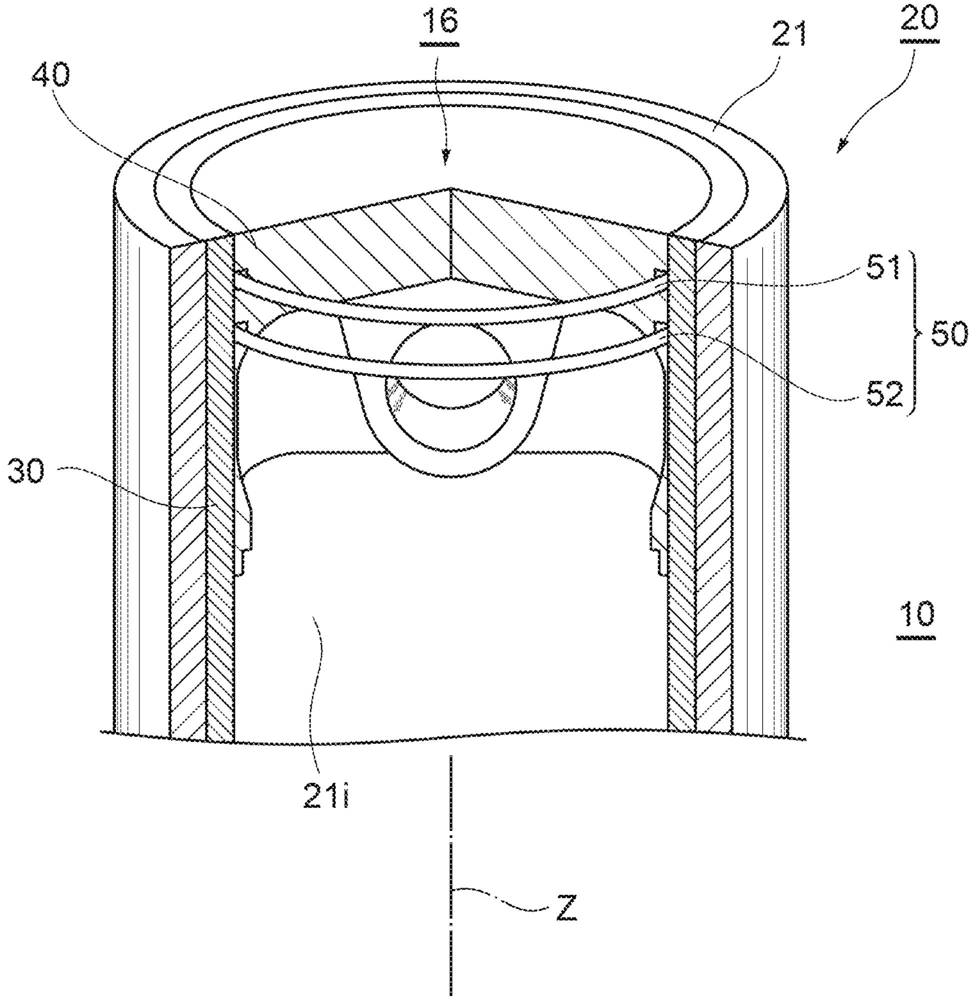
FIG. 1 is a diagram illustrating an inner structure of a reciprocating engine according to an embodiment of the present invention.

A configuration of the present invention will be described in detail below, on the basis of an example of an embodiment illustrated in the drawings (see FIG. 1, etc.).

A cylinder liner 30 according to the present invention is provided, in a cylinder block 20 of a reciprocating engine 10, on an inner face 21*i* side of a cylinder 21 made up of the cylinder block 20 and so forth, as one of crucial functional parts making up inside of the reciprocating engine 10. Description will be made below regarding an overview of a structure around the cylinder 21 inside the reciprocating engine 10, and thereafter various forms of the cylinder liner 30 will be described.

<<Inner Structure of Reciprocating Engine>>

The cylinder 21, a piston 40, and so forth, are provided in the reciprocating engine 10 according to the present embodiment (see FIG. 1). The cylinder block 20 is made up of the cylinder 21 and the cylinder liner 30. Piston rings 50 made up of a top ring 51 and a second ring 52 are fitted onto the piston 40 that reciprocally moves along a center axis Z (see FIG. 1 and FIG. 2). A compression chamber 16 for compressing gas is formed in a space between this piston 40 and a cylinder head (omitted from illustration).

Note that in the following, of directions along the center axis Z, a direction in which the piston 40 moves toward the compression chamber 16 (a direction in which cylinder capacity becomes smallest) will be referred to as “upward” for convenience, and conversely a direction in which the piston 40 moves away from the compression chamber 16 (a direction in which cylinder capacity becomes greatest) will be referred to as “downward” for convenience. Note that while such expressions of “upward” and “downward” may not apply to all cylinders 21 at the same time in a horizontally-opposed reciprocating engine 10 or the like, it should be noted that in the present specification, one certain cylinder 21 will be focused upon, and such expressions are used on the basis of the direction of action of the piston 40 for convenience in description. A stroke Z1 of the piston 40 is equivalent to the length from the top dead center of this piston 40 (an end point on the direction side at which the cylinder capacity becomes smallest is referred to as top dead center, and the piston at the top dead center is denoted by sign 40*t* in FIG. 2) to the bottom dead center thereof (an end point on the direction side at which the cylinder capacity becomes greatest is referred to as bottom dead center, and the piston at the bottom dead center is denoted by sign 40*b* in FIG. 2), strictly speaking (see FIG. 2). Conversely, a region (length) over which the piston rings 50 fitted into the piston 40 slide is a length Z3 obtained by adding, to the above stroke Z1, a distance Z2 from a groove upper face of the top ring 51 to a groove lower face of the second ring 52 (see FIG. 2). Note however, that this is a description regarding a case in which the piston rings 50 is made up of the two of the top ring 51 and the second ring 52, and it is needless to say that there can be other configurations of piston rings besides this.

<<Forms of Cylinder Liner>>

The cylinder liner 30 is provided only in a portion of a region over which the piston rings 50 slide (length Z3 in the center axis Z direction), out of the inner face 21*i* of the cylinder 21. Specific examples thereof include, for example, a cylinder liner that is partially provided, as in a form in which one bottom end portion 30*d* of the cylinder liner 30 toward the dead bottom point side is upward from the piston rings 50 at the dead bottom point (see FIG. 2) (may be referred to as “partial liner” in the present specification for convenience), a partial liner or the like in a form in which recessed and protruding forms 32 are provided to the bottom end portion 30*d* so that the length (height) in the center axis Z is irregular, and only part thereof is upward from the piston rings 50. Although these will be described later, the main point is that in the present embodiment, with a reciprocating engine 10, in which loads acting on the cylinder 21 and the piston 40 are relatively not high, as the primary object of application, the cylinder liner 30 is provided at a portion of the inner face 21*i* of the cylinder 21 where at least wear resistance with respect to the piston rings 50 is necessary, thereby strengthening only portions where necessary, and also achieving further reduction in weight.

Figure 2:
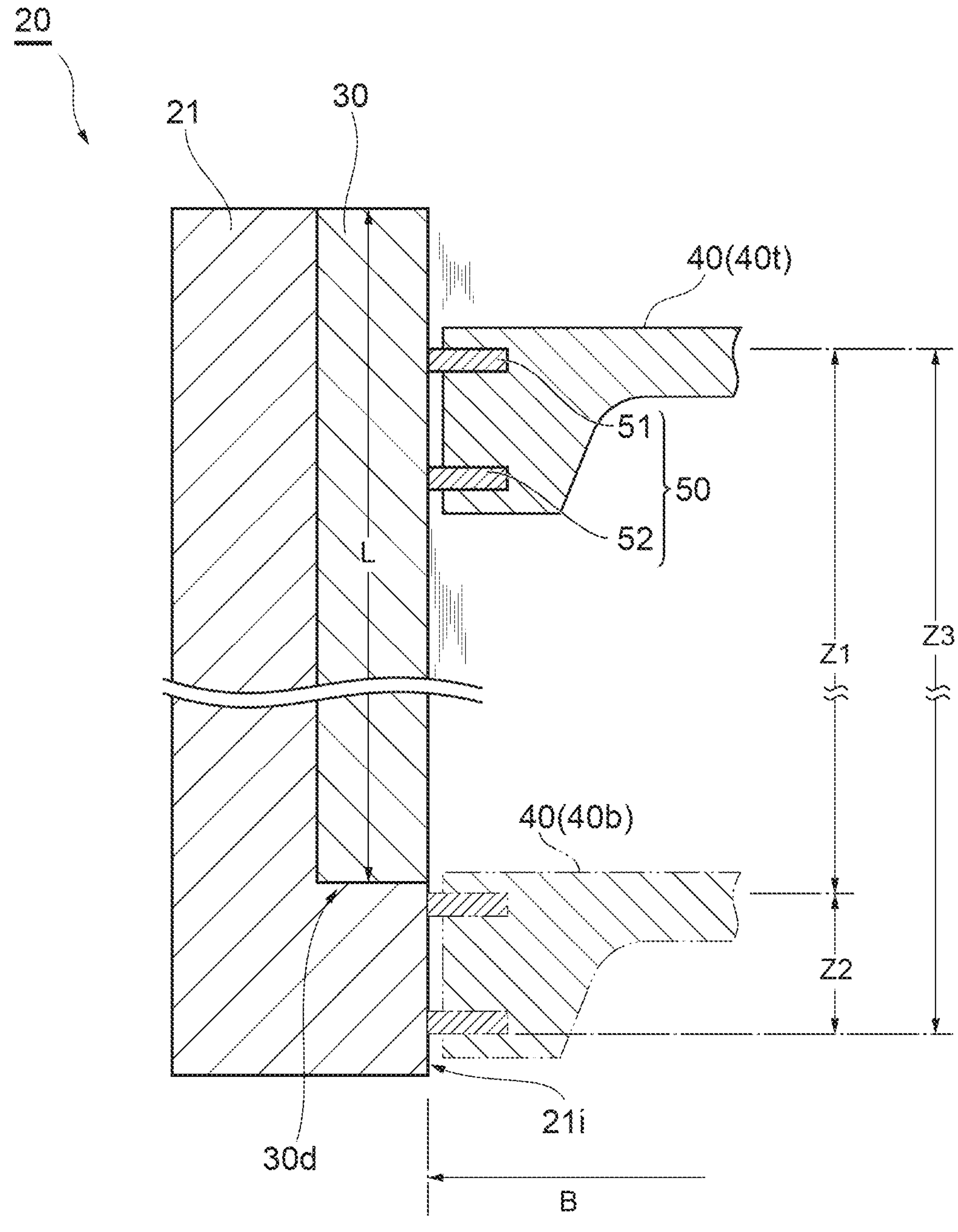
FIG. 2 is an axial-direction sectional view illustrating an inner structure at a vicinity of top dead center of a piston and at a vicinity of bottom dead center thereof, inside the reciprocating engine.

As a specific example, in the present embodiment, a length L of the cylinder liner 30 along the center axis Z (entire liner length) is smaller than an inner diameter B of the cylinder (see FIG. 2). In a common internal combustion engine, a structure is implemented in which a ratio of the inner diameter B of the cylinder and the stroke Z1 is around 1.0 (around 0.7 to 1.3), or a structure is implemented in which the entire liner length is the stroke+$\alpha$ (i.e., the upper end and lower end are somewhat longer than the length of the stroke). Conversely, according to the configuration of the present embodiment in which L<B is implemented in this way, the entire length L of the cylinder liner 30 inevitably becomes shorter accordingly.

[Recessed and Protruding Forms of Cylinder Liner]

Various forms are conceivable for the recessed and protruding forms 32 formed on the bottom end portion 30*d* of the cylinder liner 30. Specific examples will be described below (see FIGS. 3A to 3G). It should be noted that all forms exemplified in FIGS. 3A to 3G are part of the recessed and protruding forms 32 as viewed from the center axis Z toward the outer side in a radial direction.

<Form 1 of Recessed and Protruding Forms>

Of the recessed and protruding forms 32, a protruding portion 33 that protrudes downward may have a form in which an axial-direction length becomes longer, gradually or stepwise, the further downward (a width in a peripheral direction becomes narrower toward the bottom dead center). Also, the protruding portion 33 may be a form with a pointed distal end, such as a triangle of which the vertex points downward, for example (see FIG. 3A). The triangle in this case is an isosceles triangle, for example.

<Form 2 of Recessed and Protruding Forms>

Figure 3A:
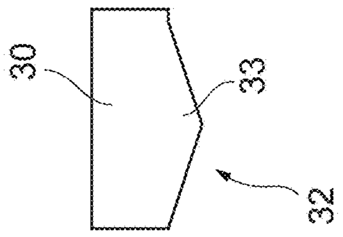
FIGS. 3A to 3G are diagrams illustrating various forms of recessed and protruding forms of a lower end portion of each cylinder liner as viewed from a center axis toward an outer side in a radial direction.
Figure 3B:
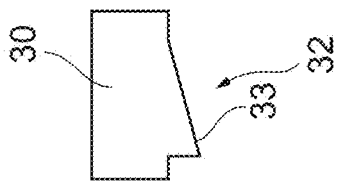

Of the recessed and protruding forms 32, the protruding portion 33 that protrudes downward may be a triangle other than an isosceles triangle (see FIG. 3B).

<Form 3 of Recessed and Protruding Forms>

Figure 3C:
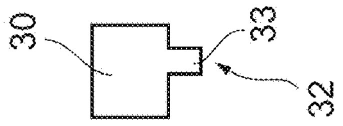

Of the recessed and protruding forms 32, the protruding portion 33 that protrudes downward may have a rectangular shape (see FIG. 3C).

<Form 4 of Recessed and Protruding Forms>

Figure 3D:
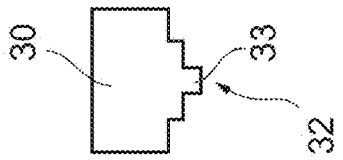

Of the recessed and protruding forms 32, the protruding portion 33 that protrudes downward may have a stepped portion in which the axial-direction length becomes long stepwise (the width in the peripheral direction becomes narrower toward the bottom dead center), and specifically, may be a stepped rectangular form provided with steps (see FIG. 3D).

<Form 5 of Recessed and Protruding Forms>

Figure 3E:
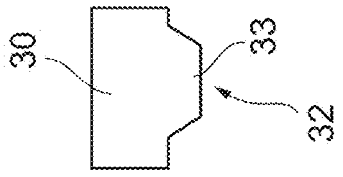

Of the recessed and protruding forms 32, the protruding portion 33 that protrudes downward may have a trapezoidal shape (see FIG. 3E). This may be a stepped form provided with steps, although not illustrated in particular.

<Form 6 of Recessed and Protruding Forms>

Figure 3F:
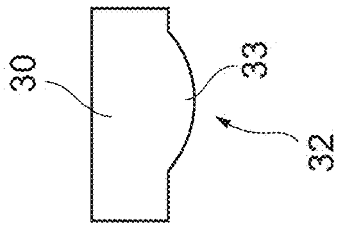

Of the recessed and protruding forms 32, the protruding portion 33 that protrudes downward may have an arcuate shape or an elliptic shape (see FIG. 3F).

<Form 7 of Recessed and Protruding Forms>

Figure 3G:
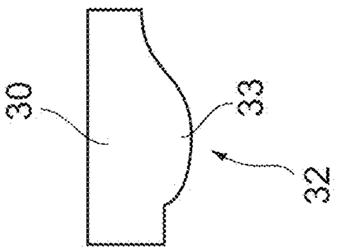

Of the recessed and protruding forms 32, the protruding portion 33 that protrudes downward may have a shape with an edge that is curved like a shape of a wave or a shape of a cloud (see FIG. 3G).

<Form 8 of Recessed and Protruding Forms>

Although not illustrated in particular, a plurality of protruding portions 33 such as described above may be disposed continuously in the peripheral direction. Alternatively, the plurality of protruding portions 33 may be disposed intermittently with certain intervals therebetween, rather than continuously.

<Form 9 of Recessed and Protruding Forms>

Although not illustrated in particular, of the recessed and protruding forms 32, the plurality of protruding portions 33 that protrudes downward may be a combination of the forms described above. In other words, as viewed along the peripheral direction, the protruding portions 33 may be a combination of different forms, rather than a repetition of the same form.

Advantages of cases in which the recessed and protruding forms 32 exemplified so far are formed on the bottom end portion 30*d* of the cylinder liner 30 are described below. That is to say, at the time of mounting a cylinder liner 30 such as a thin-walled dry-type liner that is a press-fit type, for example, to the cylinder 21, and thereafter performing inner peripheral unevenness removal machining (e.g., honing) of the cylinder liner 30 and the inner face 21*i* of the cylinder 21, providing the recessed and protruding forms 32 with the stepped portions engaging each other prevents rotation of the cylinder liner 30 in the peripheral direction, (the recessed and protruding forms 32 engage with the block side), whereby the cylinder liner 30 can be suppressed from rotating together. Also, as described above, at the partial liner in the form in which the bottom end portion 30*d* of the cylinder liner 30 is upward from the piston rings 50 (see FIG. 2), at the time of reciprocal motion of the piston 40, sudden changing of the sliding region of the piston rings 50 from the cylinder liner 30 to the cylinder 21 (or vice versa) all at once might create resistance for the reciprocal motion, but by providing the recessed and protruding forms 32 to the bottom end portion 30*d* as in the present embodiment, the shock that the piston rings 50 are subjected to when passing over the stepped portions is lessened, and the changing becomes subdued, and consequently the resistance of reciprocal motion can be reduced. That is to say, the presence of the recessed and protruding forms 32 makes the sliding of the piston rings 50 of a boundary portion of the cylinder liner 30 and the cylinder 21 smoother (not having the recessed and protruding forms 32 leads to trouble such as the piston rings 50 catching at the boundary portion of the cylinder liner 30 and the cylinder 21, causing deformation of the piston rings 50, scratching of the cylinder liner 30, and so forth). The length (height) of the protruding portion may be, for example, 1 mm or more, or may be 2 mm or more. This also may be 5 mm or less, or may be 4 mm or less, taking into consideration machining efficiency.

[Boundary Portion of Cylinder Liner and Cylinder]

There are various forms of the boundary portion of the cylinder liner 30 and the cylinder 21 in the axial direction. This portion is preferably configured from a perspective of reducing unevenness at the boundary.

<Form 1 of Boundary Portion>

Figure 4A:
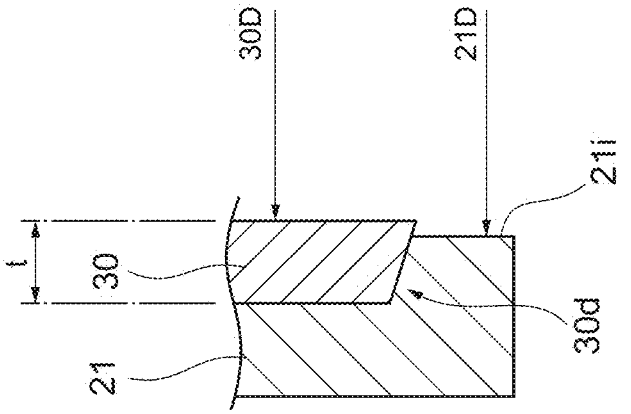
FIGS. 4A to 4C are partial axial-direction sectional views illustrating examples of forms of a boundary portion of the cylinder liner and a cylinder block in a vicinity of an end portion at a downward part of the cylinder liners (toward bottom dead center side).

The cylinder liner 30 may have a constant thickness (wall thickness) t in the radial direction, i.e., may be equivalent or uniform at any position of 360° in the circumferential direction, and also may be equivalent or uniform in the center axis Z direction (see FIG. 4A). Note that the sign 30D in FIG. 4A represents the inner diameter of the cylinder liner 30, and the sign 21D represents the inner diameter of the cylinder 21.

<Form 2 of Boundary Portion>

Figure 4B:
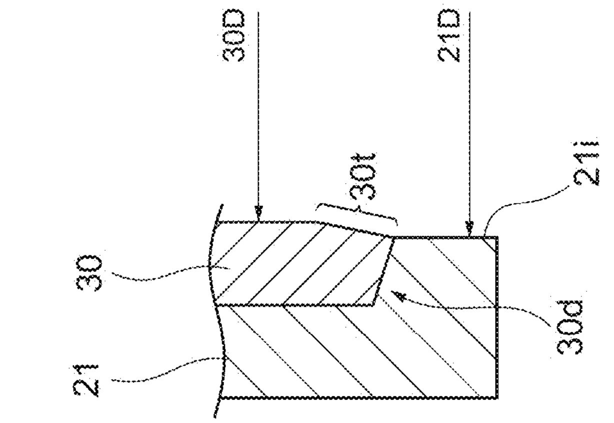

The cylinder liner 30 may be formed with a tapered shape, in which the inner diameter 30D of the cylinder liner 30 gradually increases and expands in diameter the further toward the bottom end portion 30*d* (see FIG. 4B). Note that in FIG. 4B, a tapered portion of the cylinder liner 30 is denoted by sign 30*t*. In this case, a form in which the diameter of the cylinder liner 30 gradually increases near the boundary with the cylinder 21 in particular (in other words, near the bottom end portion 30*d* of this cylinder liner 30) so as to approach the inner diameter 21D of the cylinder 21 is preferable from the point that the change in inner diameter thereof is gradual and also the inner peripheral unevenness between the cylinder liner 30 and the inner face 21*i* of the cylinder 21 is extremely small. To achieve such a structure, the cylinder liner 30 may be provided within the cylinder 21 (see FIG. 4A), and thereafter inner peripheral unevenness removal machining (e.g., honing) may be performed to grind this portion into a tapered shape, or a cylinder liner 30 that is formed in advance with a tapered shape near the bottom end portion 30*d* may be provided to the cylinder 21 (see FIG. 4B).

<Form 3 of Boundary Portion>

Figure 4C:
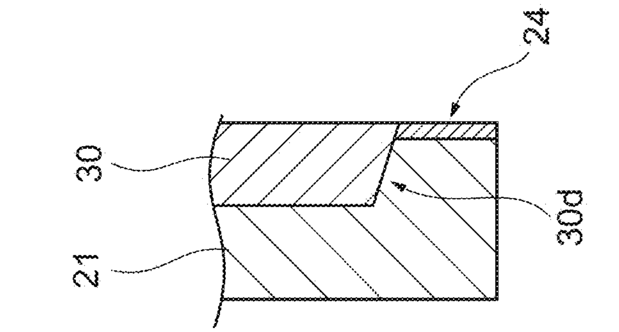

An arrangement may be made in which a break-in layer 24 is provided at a portion of an inner periphery of the cylinder 21 where the cylinder liner 30 is not mounted (in this case, basically the inner diameter 30D of the cylinder liner 30 is no greater than the inner diameter 21D of the cylinder 21), and then smooth out the face in a trial run after the piston 40 is assembled (to break in the inner peripheral face and smooth the face) (see FIG. 4C). In such cases, there are cases where the above unevenness removal machining can be omitted. Examples of members and materials making up the break-in layer 24 include soft metals, resin coatings, and so forth. Also, the inner periphery of the cylinder liner 30 side and the inner periphery of the cylinder 21 side may both be machined by honing and so forth, and provided with a lubricant oil retaining groove.

[Form of Lower End Portion of Cylinder Liner]

Various arrangements can be used for the end face form of the bottom end portion 30*d* of the cylinder liner 30. Specific examples will be described below with reference to the drawings (see FIGS. 5A to 5F).

<Form 1 of Lower End Portion of Cylinder Liner>

Figure 5A:
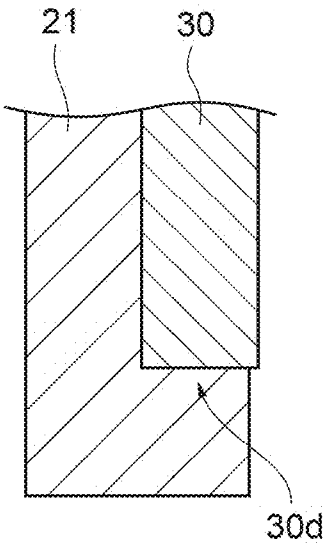
FIGS. 5A to 5F are partial axial-direction sectional views illustrating examples of sectional shapes in the vicinity of an end portion at a lower side of the cylinder liners (toward bottom dead center).
Figure 5B:
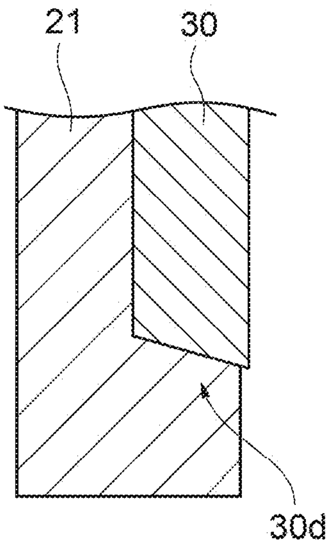
Figure 5C:
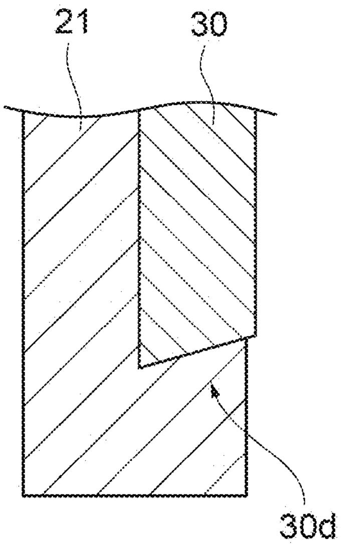
Figure 5D:
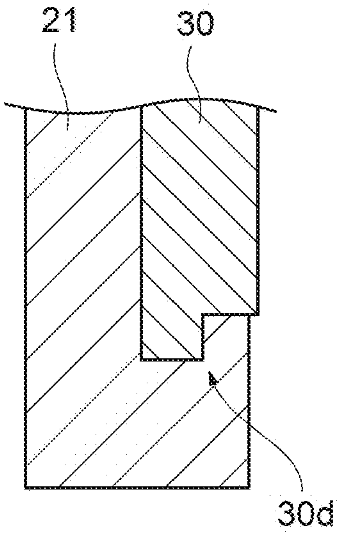

The end face form of the bottom end portion 30*d* of the cylinder liner 30 may be a straight form that is perpendicular to the center axis Z (see FIG. 5A).

<Form 2 of Lower End Portion of Cylinder Liner>

The end face form of the bottom end portion 30*d* of the cylinder liner 30 may be a tapered form that is inclined as to the center axis Z. One example of this case is a tapered form inclined downward (toward the bottom dead center) from an outer peripheral side of the cylinder liner 30 toward the inner peripheral side thereof (see FIG. 5B). In such a case, the cylinder 21 can be said to be relatively easy to machine, from the perspective of the form of a portion facing this tapered form in particular.

<Form 3 of Lower End Portion of Cylinder Liner>

The end face form of the bottom end portion 30*d* of the cylinder liner 30 may be a tapered form, and also be a tapered form inclined upward (toward the top dead center) from the outer peripheral side of the cylinder liner 30 toward the inner peripheral side (see FIG. 5C), opposite to the above form. In such a case, unevenness is not readily generated even when the cylinder 21 exhibits thermal expansion.

<Form 4 of Lower End Portion of Cylinder Liner>

The end face form of the bottom end portion 30*d* of the cylinder liner 30 may be a stepped form. One example of this case is a form in which a step is formed that heads upward (toward the top dead center) from the outer peripheral side of the cylinder liner 30 toward the inner peripheral side thereof (see FIG. 5D). Also, with the stepped form illustrated in FIG. 5D, unevenness is not readily generated even when the cylinder 21 exhibits thermal expansion.

<Form 5 of Lower End Portion of Cylinder Liner>

Figure 5E:
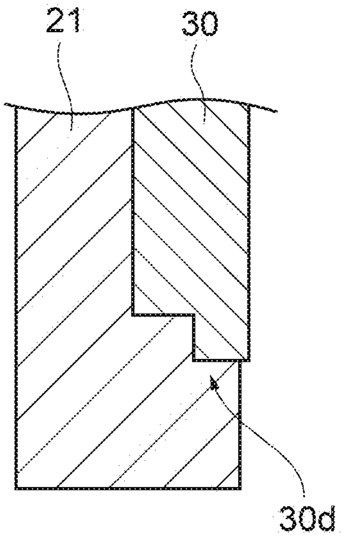
Figure 5F:
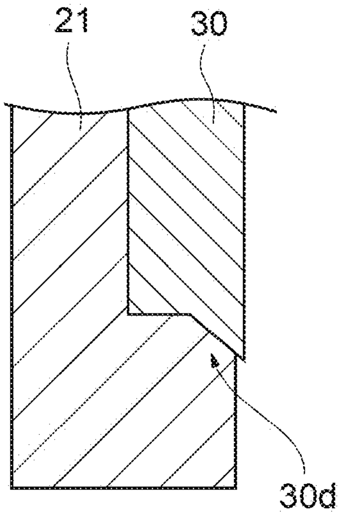

The end face form of the bottom end portion 30*d* of the cylinder liner 30 is a stepped form, and also is a form in which a step is formed that heads downward (toward the bottom dead center) from the outer peripheral side of the cylinder liner 30 toward the inner peripheral side thereof, opposite to the above form (see FIG. 5E).

<Form 6 of Lower End Portion of Cylinder Liner>

The end face form of the bottom end portion 30*d* of the cylinder liner 30 may be a combined form of the above-described forms. As an example, the end face form of the bottom end portion 30*d* may be a straight form from the outer peripheral side of the cylinder liner 30 toward the inner peripheral side thereof as far as a partway point, and become a tapered form that is inclined downward (toward the bottom dead center) from the partway point, which is a form in which the above form 1 and form 2 are combined (see FIG. 5F).

Note that these are exemplary, and not limiting in particular.

[Ways of Assembling Cylinder Liner to Cylinder]

Various arrangements can be used for the way in which the cylinder liner 30 is assembled to the cylinder 21. Two specific examples will be described below.

<Form 1 of Joining>

The cylinder liner 30 can be assembled to the cylinder 21 by a technique of inserting the cylinder liner 30 that is formed in a tube shape from an opening portion on the compression chamber 16 side of the cylinder 21 (deck face side).

<Form 2 of Joining>

The cylinder liner 30 that is formed in a tube shape can be assembled to the cylinder 21 by performing enveloped casting at the time of casting the cylinder 21. Note that in a case of screwing, the cylinder liner 30 can be removed from the cylinder 21 by performing forcible rotation thereof, when discarding the reciprocating engine 10. For example, in the case of FIG. 3B, the cylinder liner 30 can be readily removed from the cylinder 21 by rotating in a long-side side direction of the protruding portion 33. Note that while a protruding portion 33 that is a right triangle is exemplified in FIG. 3B, other shapes may be used.

[Joint Portion of Cylinder Liner and Cylinder]

There are various arrangements available as techniques for joining the cylinder liner 30 and the cylinder 21, and for the form of this portion.

<Form 1 of Joint Portion>

An adhesive layer may be provided on the outer periphery of the cylinder liner 30, although not illustrated in particular. Thus, joining strength of the cylinder liner 30 and the cylinder 21 can be improved. Note that in a case of an internal combustion engine, a metal, alloy, or the like, having a melting point of 200° C. or higher, for example, can be applied as the adhesive layer.

<Form 2 of Joint Portion>

In a case of a configuration of assembling the cylinder liner 30 to the cylinder 21 by inserting the cylinder liner 30 that is formed in a tube shape from the opening portion on a compression chamber 16 side face of the cylinder 21 (deck face) side, shrink fitting or cool fitting can be used.

<Form 3 of Joint Portion>

In a case of assembling the cylinder liner 30 to the cylinder 21 by enveloped casting as in "Form 2 of Joining" above, compressive stress acts on the cylinder liner 30 at the time of casting. In light of this point, intentionally not providing the recessed and protruding forms to the bottom end portion 30*d* of the cylinder liner 30 to function to prevent rotation is an option.

<Form 4 of Joint Portion>

Figure 6:
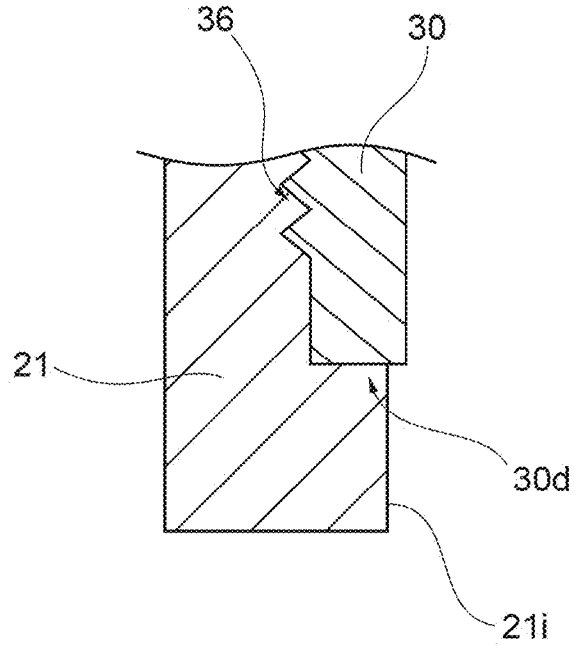
FIG. 6 is a diagram illustrating an example of a form of a screwing portion of the cylinder liner and the cylinder block.

A screw portion 36 may be formed on the outer periphery of the cylinder liner 30 in advance. In a case of assembling the cylinder liner 30 to the cylinder 21 by enveloped casting as in "Form 2 of Joining" above, for example, a configuration may be made in which joining to the cylinder 21 is realized at a portion of this screw portion 36 in particular (see FIG. 6). In a case in which part of the outer perimeter of the cylinder liner 30 has such a screw form, the cylinder liner 30 can be removed from the cylinder 21 for sorting, by performing rotation thereof at the time of discarding. Further, the cylinder liner is more readily extracted when the height of the protruding portion 33 is lower than a pitch of the screw portion 36.

As described so far, the cylinder liner 30 according to the present embodiment can be removed, separated, and sorted from the cylinder 21 at the time of discarding or the like, unlike conventional structures in which the entire outer periphery is enveloped with the casting material in enveloped casting, and accordingly a reciprocating engine 10 of a structure with improved recycling performance in particular, and that is environmentally friendly, is realized. Also, in the present embodiment, a configuration is employed in which the cylinder liner 30 is provided only in a portion of the region where the piston rings 50 slide, and accordingly the entire length (axial-direction length) of the cylinder liner 30 can be shortened, thereby enabling reduction in size and reduction in weight to be realized.

Note that while the embodiment described above is an example according to a preferred embodiment of the present invention, this is not limiting, and can be carried out modified variously without departing from the essence of the present invention. For example, an example of a configuration is described in the embodiment described above in which the cylinder liner 30 is provided in just a portion of the range where the piston rings 50 slide, excluding a portion near the bottom dead center, in other words, an example of a configuration in which the cylinder liner 30 is provided so as to cover at least the region of near the upper dead center of the piston rings 50, but this is only a preferred example. The main point is that in the above embodiment, it is sufficient for the cylinder liner 30 to be provided to at least a portion of the inner face 21*i* of the cylinder 21 where wear resistance is necessary. Also, while representative examples of the piston rings 50 include the top ring 51 and the second ring 52 (see FIG. 1, etc.), it is needless to say that such a configuration is not limiting. Also, the range of application of the contents described above is not limited to an internal combustion engine, and neither is limited to a crank mechanism. Also, the cylinder liner 30 does not need to be inserted into a block after the inner peripheral face thereof is finished, such as with dry-type and wet-type linters, and also is applicable to blocks such as aluminum alloys, resins, and so forth (other than cast iron).

INDUSTRIAL APPLICABILITY

The present invention is suitable for application to a cylinder liner, and a reciprocating engine having the cylinder liner.

REFERENCE SIGNS LIST

10 Reciprocating engine
16 Compression chamber
20 Cylinder block
21 Cylinder
21*i* Inner face of cylinder
24 Break-in layer
30 Cylinder liner
30*d* Bottom end portion of cylinder liner toward bottom dead center side (one end portion)
30D Inner diameter of cylinder liner
30*t* Tapered portion
32 Recessed and protruding forms formed on end portion
33 Protruding portions of recessed and protruding forms
36 Screw portion
40 Piston
40*b* Piston at bottom dead center
40*t* Piston at top dead center
50 Piston rings
51 Top ring
52 Second ring
B Inner diameter of cylinder
L Entire length of cylinder liner (liner entire length)
t Wall thickness of cylinder liner (thickness in radial direction)
Z Center axis
Z1 Stroke of piston
Z2 Distance from groove upper face of the top ring to groove lower face of second ring
Z3 Region (length) over which piston rings fit onto piston slide

What is claimed is:

1. A cylinder liner provided in a reciprocating engine, the cylinder liner being a cylinder liner:

which is provided in, out of an inner face of a cylinder in the reciprocating engine, only a partial region over which a piston ring fits onto a piston that performs reciprocal motion in the cylinder slides, except for a region near a top ring at a bottom dead center of the piston in the cylinder; and in which a cylinder liner entire length along an axial direction of the cylinder is smaller than an inner diameter of the cylinder, wherein the cylinder liner is assembled to the cylinder by inserting the cylinder liner only from an opening portion on a compression chamber side of the cylinder, wherein the cylinder liner includes a structure where recessed and protruding forms, which change in axial-direction length, are formed on one end portion that is an end portion toward a bottom dead center side of the piston ring in the axial direction, and wherein the cylinder liner is formed in a tapered form in which an inner diameter of the cylinder liner gradually increases and expands in diameter from the recessed and protruding forms toward the bottom dead center side of the piston ring.

2. The cylinder liner according to claim 1, wherein, out of the recessed and protruding forms, a protruding portion that protrudes to the bottom dead center side is formed having a shape in which the axial-direction length becomes longer, gradually or stepwise, toward the bottom dead center side of the piston ring.

3. The cylinder liner according to claim 1, wherein a plurality of the protruding portions forming the recessed and protruding forms are disposed continuously in a peripheral direction.

4. The cylinder liner according to claim 1, wherein a radial-direction thickness thereof changes gradually or stepwise.

5. The cylinder liner according to claim 1, wherein an adhesive layer is provided on an outer periphery of the cylinder liner.

6. The cylinder liner according to claim 1, wherein a screw portion is formed on at least part of an outer periphery of the cylinder liner.

7. A reciprocating engine, wherein an inner diameter of the cylinder liner according to claim 1 is equal to or less than an inner diameter of the cylinder.

8. A reciprocating engine, wherein the cylinder liner according to claim 1 is provided to, of the inner face of the cylinder, at least a portion where wear resistance with respect to the piston ring is necessary.

9. The reciprocating engine according to claim 8, wherein the cylinder liner is provided to, of the inner face of the cylinder, the region near the top ring at a top dead center of the piston in the cylinder.

10. A cylinder liner provided in a reciprocating engine, the cylinder liner being a cylinder liner:

which is provided in, out of an inner face of a cylinder in the reciprocating engine, only a partial region over which a piston ring fits onto a piston that performs reciprocal motion in the cylinder slides, except for a region near a top ring at a bottom dead center of the piston in the cylinder; and in which a cylinder liner entire length along an axial direction of the cylinder is smaller than an inner diameter of the cylinder, wherein the cylinder liner is assembled to the cylinder by inserting the cylinder liner only from an opening portion on a compression chamber side of the cylinder, wherein the cylinder liner includes a structure where recessed and protruding forms, which change in axial-direction length, are formed on one end portion that is an end portion toward a bottom dead center side of the piston ring in the axial direction, and wherein, out of the recessed and protruding forms, an axial-direction length of a protruding portion that protrudes to the bottom dead center side is shorter than a pitch of a screw of the screw portion.

* * * * *